Patented Oct. 18, 1949

2,485,270

UNITED STATES PATENT OFFICE 2,485,270

POLYMERIZATION OF CHLOROETHYLENE COMPOUNDS IN AQUEOUS EMULSION IN THE PRESENCE OF AMINO-ALCOHOLS

Vernon L. Folt, Akron, Ohio, assignor to The B. F. Goodrich Company, New York, N. Y., a corporation of New York No Drawing. Application June 12, 1947, Serial No. 754,260

7 Claims. (Cl. 260—92.8)

This invention relates to the polymerization in aqueous emulsion of unsaturated compounds containing a single $CH_2=C<$ group, that is, monomeric mono-vinylidene compounds, either alone or in admixture with one another or with other unsaturated materials. The invention more specifically relates to the polymerization in aqueous emulsion of monomeric materials comprised predominantly of chlorethylenes such as vinyl chloride and vinylidene chloride.

It is well known that resinous linear polymers can be prepared by polymerization of mono-vinylidene compounds in aqueous emulsion, and obtained either as stable dispersions or latices or in the form of fine granular material. When vinyl chloride or vinylidene chloride is polymerized, it has been found desirable to maintain the pH of the emulsion at or slightly above the neutral point in order to obtain stable dispersions of the resinous product and to achieve high yields. It has been observed, however, that the pH of a vinyl chloride emulsion, which is originally about 8.0 to 8.5, drops steadily during polymerization until at the end of the reaction the pH ranges from 3.0–3.5. Frequently, such an undesirable drop in pH makes it necessary to carry out the reaction at lower temperatures and for an excessively long time in order to obtain satisfactory yields.

It is also known that certain substances may be incorporated in a vinyl chloride polymerization mixture to act as buffers to maintain the pH at or above the neutral point. For example, lead acetate, salts of strong bases and weak acids such as sodium bicarbonate, sodium acetate and the like, have been utilized as buffers in vinyl chloride polymerizations. However, the use of such substances is subject to many disadvantages, for example, they introduce metallic ions into the polymerization mixture, which ions often adversely affect the chemical and physical stability and electrical properties of the resultant polymer. Still another disadvantage of many of these compounds is that they break down under polymerization conditions or react with hydrogen chloride liberated during polymerization to evolve acidic substances, (carbon dioxide in the case of sodium bicarbonate or acetic acid in the case of lead acetate and sodium acetate) all of which tend to change the pH in an unpredictable fashion. Moreover, some of the buffering substances known to the art fail to maintain the pH at the neutral point unless used in such large amounts that they become difficult to remove from the polymer and are retained in the polymer in small amounts, thereby impairing the transparency and clarity of the finished resin.

For these and other reasons, it is desirable that the pH of the polymerization mixtures be maintained at or above the neutral point, and that, generally speaking, the substance used as a buffer be capable of maintaining the pH of the reaction mixture at the desired point when present in small amounts and be free of metallic ions, in order to avoid formation of an unstable dispersion and to prevent an adverse effect on the electrical properties and clarity of the polymer. Accordingly, it is the principal object of this invention to provide buffering substances for use in emulsion polymerization of vinyl chloride and other monomers which will possess these properties and be free of the above-mentioned defects. Another object is to provide materials which act both as buffers and emulsifiers. Other objects will be apparent from the following description.

These objects are attained by the method of this invention which comprises polymerizing a monomeric mono-vinylidene compound in an aqueous emulsion containing an aliphatic amino-substituted alcohol such as 2-amino-2-methyl-1-propanol. The amino-substituted alcohols are sufficiently basic in character and so readily take up hydrochloric acid that small amounts are capable of maintaining the pH of a vinyl chloride polymerization mixture in the desired range of 7.0 to 8.5 without the liberation of undesirable reaction products. Furthermore, rapid polymerizations are possible by the use of the aliphatic amino-substituted alcohols, and yields of 90 to substantially 100% are generally obtained within about 16 to 24 hours.

Contrary to usual practice, which is to polymerize the monomeric material in an evacuated system or in an inert atmosphere, I have found that when using such amino-substituted alcohols it is preferable to carry out the polymerization of mono-vinylidene compounds in the presence of gaseous oxygen. For example, when the polymerization of a vinyl chloride emulsion containing an amino-substituted alcohol is attempted in an evacuated polymerization vessel, or in the presence of an inert atmosphere such as nitrogen, I have found that polymerization at temperatures of 50 to 60° C. and times of 40 to 60 hours or more are required, but when the ingredients of the emulsion are charged to the reaction vessel and the vessel sealed in a manner as to entrap considerable air, polymerization begins immediately and yields of 90 to substantially 100% are obtained in about 16 to 24 hours. This result is quite surprising since both gaseous oxygen and compounds containing amino groups generally inhibit polymerization.

It has also been found that the aliphatic amino-substituted alcohols employed in the method of this invention not only act to maintain the pH of the reaction mixture at or slightly above the neutral point, but also serve to emulsify the monomeric material during polymerization and to stabilize the latex-like dispersion obtained. Accordingly, smaller than normal amounts of ordinary emulsifying agents may be employed when an aliphatic amino-substituted alcohol is present. Ordinary emulsifying agents may even be omitted entirely and the aliphatic amino-substituted alcohol used in the dual capacity of emulsifier and buffer, for example, vinyl chloride may be polymerized in aqueous emulsion in the presence of an amino-substituted alcohol and in the absence of any other emulsifying agent to yield an excellent polymer.

The method of this invention is applicable to the emulsion polymerization of any mono-vinylidene compound, i. e., any monomeric material which contains a single olefinic bond linking a methylene group to a carbon atom in the structure CH$_2$=C<, which undergoes addition polymerization in aqueous emulsion to form a linear polymer. Illustrative examples of such monomers are vinyl halides such as vinyl chloride, vinyl bromide or vinyl fluoride; vinyl esters such as vinyl acetate, vinyl chloroacetate, vinyl propionate, vinyl butyrate, and others; vinyl ethers such as vinyl methyl ether, vinyl isobutyl ether, vinyl 2-chloroethyl ether, and others; vinyl ketones such as vinyl methyl ketone, vinyl hexyl ketone, vinyl isopropenyl ketone, and others; ethylene; isobutylene; styrene, and p-chlorostyrene; esters of alpha-methylene aliphatic monocarboxylic acids such as methyl acrylate, ethyl acrylate, n-butyl acrylate, isobutyl acrylate, dodecyl acrylate, 2-chloroethyl acrylate, 2-chloropropyl acrylate, 2,2'-dichloro-isopropyl acrylate, phenyl acrylate, cyclohexyl acrylate, methyl alpha-chloro-acrylate, methyl methacrylate, ethyl methacrylate, methyl ethacrylate, and others; vinylidene halides such as vinylidene chloride, vinylidene chlorofluoride; N-vinyl compounds such as N-vinyl pyridine, N-vinyl pyrrole, N-vinyl carbazole, N-vinyl indole, N-vinyl succinimide, and others; and other similar polymerizable materials. All these materials are mono-vinylidene compounds, it being understood that mono-vinyl compounds contain the vinylidene structure CH$_2$=C< and are hence a sub-genus of mono-vinylidene compounds. The method of this invention is also applicable to the polymerization of mixtures of two or more of these monomeric materials and to the polymerization of mixtures of these compounds with other unsaturated monomers including other compounds containing a single olefinic bond such as the alkyl esters of maleic and fumaric acids, and even monomers containing more than one double bond such as butadiene-1,3, chloroprene, diallyl maleate, etc.

The invention is most applicable to the polymerization of these monomeric materials which comprise predominantly a chloroethylene containing from one to two chlorine atoms on one only of the carbon atoms, and having only hydrogen atoms attached to the remaining valences of the ethylenic carbon atoms. Included in such materials are, for example, vinyl chloride, vinylidene chloride, mixtures of these monomers with each other and with lesser proportions of other copolymerizable mono-vinylidene compounds such as vinyl acetate, vinyl propionate, vinyl butyrate, esters of alpha-methylene aliphatic monocarboxylic acids, particularly alkyl acrylates and methacrylates such as methyl acrylate, ethyl acrylate, methyl methacrylate, ethyl methacrylate, methyl ethacrylate, butyl acrylate, dodecyl acrylate, or the like, and mixtures of these monomers with other monomeric unsaturated compounds such as dialkyl fumarates, dialkyl chloromaleates, diallyl chloromaleate, dialkyl maleates, alkyl crotonates, allyl hydracrylate, etc.

The aliphatic amino-substituted alcohol employed may be any compound having the general formula NH$_2$—R—(OH)$_n$ wherein R is an aliphatic hydrocarbon radical containing from 2 to 6 carbon atoms, and $n$ is an integer from 1 to 3. Examples of compounds which may be used in the present invention are:

2-amino-ethanol
2-amino-2-methyl-1-propanol
2-amino-2-methyl-1,3-propanediol
2-amino-2-ethyl-1,3-propanediol
3-amino-2-methyl-1-propanol
2-amino-1-butanol
3-amino-2,2-dimethyl-1-propanol
2-amino-2,3-dimethyl-1-propanol
2,2-diethyl-2-amino ethanol
2,2-dimethyl-2-amino ethanol
3-amino-1,2-butanediol
4-amino-1,2-butanediol
2-amino-1,3-butanediol
4-amino-1,3-butanediol
4,4-dimethyl-1,3-butanediol
2-amino-1,4-butanediol
3-amino-1,4-butanediol
1-amino-2,3-butanediol
Tris-(hydroxy methyl) amino methane The amount of aliphatic amino-substituted alcohol which is used may vary from as little as 0.1% to as much as 5% by weight based on the monomeric material. The amount necessary to maintain a stable dispersion without appreciable coalescence and coagulation will, of course, depend on the type and amount of other emulsifying or dispersing agents used, if any, and the monomer being polymerized. If the amino-substituted alcohol is used alone in the dual capacity of emulsifier and buffer, larger amounts are used than when another emulsifying agent is present. For example, when 0.6 to 1.0% of a synthetic saponaceous emulsifying agent (such as, for example, sodium isobutyl naphthalene sulfonate) is used as the primary emulsifying agent, about 0.30 to 1.5% of the amino-substituted alcohol is sufficient to act as a buffer. When used alone, it has been found that 0.8 to 1.5% or more of the amino-substituted alcohol is desirable.

The following specific examples are given as illustrations of the nature of this invention, but are not intended as a limitation upon the scope thereof.

EXAMPLES 1 TO 3

To illustrate the action of the aliphatic amino-substituted alcohols in the dual capacity of emulsifying agent and buffer, emulsions containing the following materials were prepared and then agitated at 50° C. to bring about polymerization of the monomeric materials present.

| Material: | Amount |
|---|---|
| Vinyl chloride | parts__ 90 |
| Diethyl chloromaleate | do____ 10 |
| 2-amino-2-methyl-1-propanol | Variable |
| O,O'-dichlorobenzoyl peroxide | __part__ 0.3 |
| Atmosphere | Air |

The amounts of 2-amino-2-methyl-1-propanol used were respectively 0.25, 0.50 and 1.0 parts. In all cases the polymerization required only 16 to 24 hours to produce a 95 to 100% yield of a fine granular polymeric product which was possessed of excellent physical and electrical properties and could be plasticized to give a clear, transparent film. The pH of the aqueous phase was found to range from 6.5 to 8.0. When no amino alcohol was used, however, the pH dropped to below 3.0, and the polymerization required a much longer time.

EXAMPLES 4 TO 9

The results of the above examples indicate that 2-amino-2-methyl-1-propanol operates very effectively to give desirable copolymers. The following examples were performed in order to evaluate a number of the amino-substituted alcohols and to determine the optimum amounts necessary to maintain the pH. The following materials were subjected to polymerization conditions in small glass tubes:

Material: Amount
Vinyl chloride _____ parts__ 100
Water _____ do____ 250
Sodium isobutyl naphthalene
 sulfonate _____ do____ 0.625
Amino-substituted alcohol _____ Variable
O,O'-dichlorobenzoyl peroxide ____ part__ 0.3
Temperature _____ °C___ 50
Atmosphere _____ Air

| Example No. | Amino-substituted alcohol | Yield | pH Before Polym. | pH After Polym. |
|---|---|---|---|---|
| | | Grams | | |
| 4 | 2-amino-2-methyl-1-propanol, 0.0625 grams. | 9.8 | 9.49 | 8.51 |
| 5 | 2-amino-2-methyl-1,3-propanediol, 0.0625 grams. | 9.90 | 8.91 | 8.00 |
| 6 | 2-amino-1-butanol: 0.0625 grams | 9.00 | 9.03 | 6.83 |
| 7 | 0.0927 grams | 9.60 | 9.28 | 7.46 |
| 8 | 2-amino-2-ethyl-1,3-propanediol, 0.0927. | 9.86 | 9.10 | 6.88 |
| 9 | Tris (hydroxymethyl) amino methane, 0.0625 grams. | 9.29 | 8.76 | 6.21 |

From the foregoing, it is seen that, generally, 0.6% to 0.93% or more of the amino-substituted alcohol is necessary to maintain the pH when using another emulsifying agent with the amino-substituted alcohol. It is also seen that for some of the amino-substituted alcohols tested, as much as 1.2 to 1.5% of alcohol is necessary to maintain the pH. It is also to be noted, that in most cases the yields ranged from 90 to substantially 100%.

EXAMPLES 10 TO 14

The foregoing specific examples describe the process of this invention applied to the polymerization of monomeric mixtures consisting predominantly of vinyl chloride or of vinyl chloride alone. It has been found, however, that it may be applied with equal facility to other monomeric materials within the scope of the invention as defined in the appended claims. A series of polymers were prepared using from 1 to 99% of each monomer according to the following general recipe:

Recipe
Material: Parts by weight
 Monomer 1 } Variable to total_____ 100.0
 Monomer 2 }
 Water _____ 250.0
 Sodium isobutyl naphthalene sulfonate  0.625
 2-amino-2-methyl-1-propanol _____ 0.625
 O,O-dichlorobenzoyl peroxide _____ 0.300
 Temperature _____°C__ 50
 Time _____hours__ 48
 Atmosphere _____ Air
 Polymerizer _____ Small glass tubes The following table presents the experimental results:

| Example | Monomers—Parts by Weight | Spec. Viscosity | Per Cent Yield | Remarks |
|---|---|---|---|---|
| 10 | Diethyl Maleate (50); Vinyl Chloride (50). | 0.19 | 94.4 | Per cent chlorine—found 28.5; Per cent chlorine—theory 28.4. Transparent Polymer. |
| 11 | Diethyl Fumarate (10); Methyl Acrylate (90). | 3.96 | 91.6 | Polymer insoluble in methyl ethyl ketone and nitrobenzene; soft, spongy and transparent spheres of polymer, clear and colorless moldings. |
| 12 | Vinyl Chloride (40); Diallyl Chloromaleate (60). | 0.54 | 94.3 | Polymer is in the form of spherical balls which are hard and glassy—produces rubbery moldings. |
| 13 | Vinyl Acetate (95); Dimethyl Maleate (5). | 0.54 | 94.3 | Polymer clear and hard. |
| 14 | Diethyl Maleate (10), Vinyl Acetate (90). | 0.66 | 96.3 | Transparent spheres of polymer. |

In addition, resinous copolymers were obtained in yields of 90% or more by polymerizing the following monomer combinations in the presence of an amino-substituted alcohol according to the methods shown in the preceding examples:

Vinylidene chloride—n-butyl maleate
Vinylidene chloride—vinyl chloride—ethyl maleate
Methyl crotonate—ethyl acrylate
Dialkyl chloromaleate—vinyl chloride
Styrene—allyl hydracrylate
N-butyl maleate—acrylonitrile
Vinyl chloride—vinyl acetate
Vinyl chloride—vinyl isopropyl ether
Vinylidene chloride—vinyl isopropyl ether
Vinyl chloride—2-vinyl furane
Vinyl chloride—diethyl monochloromaleate
Vinyl chloride—vinylidene chloride
Vinyl chloride—acrylonitrile
Vinylidene chloride—acrylonitrile Any of the usual dispersing agents such as the sodium and potassium salts of fatty acids and the synthetic saponaceous materials may be employed in conjunction with the aliphatic amino-substituted alcohols. The synthetic saponaceous materials such as the hymolal sulfates and alkaryl sulfonates are preferred in the practice of this invention, for example, sodium lauryl sulfate, sodium isopropyl naphthalene sulfonate, sodium isobutyl naphthalene sulfonate, and such materials as the dialkyl succinamates, the sodium salt of N-octadecyl-N-1,2-dicarboxyethyl sulfosuccinamate, etc. Mixtures of two or more dispersing agents may also be used, for example, a mixture of equal proportions of the latter compound in the above list and sodium lauryl benzene sulfonate gives excellent results when combined with the aliphatic amino-substituted alcohols of this invention.

Any of the usual peroxygen-type catalysts, instead of the one described in the specific example, may be employed in the process of this invention; for example, benzoyl peroxide, caprylyl peroxide, hydrogen peroxide, ammonium persulfate, sodium perborate, the percarbonates, the persulfates, or the like or mixtures of two or more of such materials may be used. Other modifying or catalyzing substances may be used as is well understood by the art.

The polymerization according to the method of this invention may be carried out at temperatures from 10 to 90° C. but according to the preferred practice of the art, polymerization at temperatures of 40 to 60° C. will result in superior polymerizates and moreover will accomplish substantially complete reaction in a reasonable time.

The present application is a continuation-in-part of my copending application, Serial No. 519,913, filed January 27, 1944, and entitled Polymerization of vinyl chloride and vinylidene chloride with dialkyl esters of chloromaleic acids, now abandoned.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

I claim:

1. The method which comprises polymerizing a monomeric material comprising predominantly a chloroethylene having from one to two chlorine atoms on one only of the carbon atoms, and having only hydrogen atoms attached to the remaining valences of the ethylenic carbon atoms, in aqueous emulsion in the presence of an aliphatic amino-substituted alcohol of the structure $NH_2-R-(OH)_n$ wherein R is an aliphatic hydrocarbon radical containing from 2 to 6 carbon atoms and $n$ is an integer from 1 to 3.

2. The method which comprises dispersing a monomeric material comprising predominantly a chloroethylene having from one to two chlorine atoms on one only of the carbon atoms, and having only hydrogen attached to the remaining valences of the ethylenic carbon atoms in an aqueous media comprising a peroxygen type catalyzing substance and an aliphatic amino-substituted alcohol of the structure $NH_2-R-(OH)_n$ wherein R is an aliphatic hydrocarbon radical containing from 2 to 6 carbon atoms and $n$ is an integer from 1 to 3 and heating the aqueous emulsion containing the monomeric material at a temperature of from 30 to 90° C. to accomplish polymerization of said monomeric material.

3. The method which comprises polymerizing a monomeric material comprising predominantly vinyl chloride in aqueous emulsion in the presence of an aliphatic amino-substituted alcohol of the structure $NH_2-R-(OH)_n$ wherein R is an aliphatic hydrocarbon radical containing from 2 to 6 carbon atoms and $n$ is an integer from 1 to 3.

4. The method of polymerization which comprises polymerizing vinyl chloride in aqueous emulsion in the presence of an aliphatic amino-substituted alcohol of the structure $$NH_2-R-(OH)_n$$

wherein R is an aliphatic hydrocarbon radical containing from 2 to 6 carbon atoms and $n$ is an integer from 1 to 3.

5. The method which comprises dispersing a monomeric material comprising predominantly vinyl chloride in an aqueous media comprising a peroxygen type catalyzing substance, an aliphatic amino-substituted alcohol of the structure $$NH_2-R-(OH)_n$$

wherein R is an aliphatic hydrocarbon radical containing from 2 to 6 carbon atoms and $n$ is an integer from 1 to 3 and gaseous oxygen, and heating the aqueous emulsion of monomeric material at a temperature of from 30 to 90° C. to initiate polymerization.

6. The method which comprises polymerizing a monomeric material comprising predominantly a chloroethylene having from one to two chlorine atoms on one only of the carbon atoms, and having only hydrogen atoms attached to the remaining valences of the ethylenic carbon atoms, in aqueous emulsion in the presence of 2-amino-2-methyl-1-propanol.

7. The method which comprises polymerizing a monomeric material comprising predominantly of vinyl chloride in aqueous dispersion in the presence of 2-amino-2-methyl-1-propanol.

VERNON L. FOLT.

REFERENCES CITED

The following references are of record in the file of this patent:

UNITED STATES PATENTS

| Number | Name | Date |
|---|---|---|
| 2,393,438 | Weisberg | Jan. 22, 1946 |
| 2,422,392 | Brubaker | June 17, 1947 |

Certificate of Correction

Patent No. 2,485,270                                                          October 18, 1949

VERNON L. FOLT

It is hereby certified that errors appear in the printed specification of the above numbered patent requiring correction as follows:

Column 2, line 4, for the word "mixtures" read *mixture*; column 6, line 15, for "O,O-dichlorobenzoyl" read *O,O'-dichlorobenzoyl*; and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*